US007720900B2

(12) United States Patent
Gerwig et al.

(10) Patent No.: US 7,720,900 B2
(45) Date of Patent: May 18, 2010

(54) FUSED MULTIPLY ADD SPLIT FOR MULTIPLE PRECISION ARITHMETIC

(75) Inventors: Guenter Gerwig, Boeblingen (DE); Eric M. Schwarz, Gardiner, NY (US); Ronald M. Smith, Sr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 11/223,641

(22) Filed: Sep. 9, 2005

(65) Prior Publication Data

US 2007/0061392 A1    Mar. 15, 2007

(51) Int. Cl.
    G06F 7/38    (2006.01)
(52) U.S. Cl. .................................... 708/501
(58) Field of Classification Search .................. 708/501
    See application file for complete search history.

(56) References Cited

U.S. PATENT DOCUMENTS

| | | | | |
|---|---|---|---|---|
| 4,969,118 A | * | 11/1990 | Montoye et al. | 708/501 |
| 5,928,316 A | * | 7/1999 | Wong et al. | 708/501 |
| 6,061,707 A | * | 5/2000 | Dibrino et al. | 708/505 |
| 6,256,655 B1 | * | 7/2001 | Ezer et al. | 708/501 |
| 6,751,644 B1 | * | 6/2004 | Chng et al. | 708/501 |

* cited by examiner

Primary Examiner—Tan V Mai
(74) Attorney, Agent, or Firm—Scully, Scott, Murphy & Presser, P.C.; John E. Campbell

(57) ABSTRACT

An apparatus and method for performing floating-point operations, particularly a fused multiply add operation. The apparatus includes a arithmetic logic unit adapted to produce both a high-order part (H) and a low-order part (L) of an intermediate extended result according to H, $L=A*B+C$, where A, B are input operands and C an addend. Each H, L part is formatted the same as the format of the input operands, and alignment of the resulting fractions is not affected by alignment of the inputs. The apparatus includes an architecture for suppressing left-alignment of the intermediate extended result, such that input operands for a subsequent $A*B+C$ operation remain right-aligned.

14 Claims, 2 Drawing Sheets

| Operand | native HFP format | Exponent | Fraction (internally) |
|---|---|---|---|
| A Multiplier | 42 000101 01000000 | 42 | 0.000101 01000000 |
| B Multiplicand | 43 020000 00000003 | 43 | 0.020000 00000003 |
| C Addend | 41 111111 11111111 | 41 | 0.111111 11111111 |
| Product (double wide) | | 45 | 0.000002 02020000 000303 03000000 |
| Aligned Addend (double wide) | | 45 | 0.000011 11111111 1111000000000000 |
| Raw Result (extended -double wide) | | 45 | 0.000013 13131111 111403 03000000 |
| High Result | 45 000013 13131111 | 45 | 0.000013 13131111 |
| Low Result (exponent -14 or x'E') | 37 111403 03000000 | 37 | 0.111403 03000000 |

Fig. 2

FUSED MULTIPLY ADD SPLIT FOR MULTIPLE PRECISION ARITHMETIC

BACKGROUND OF THE INVENTION

1. Field of the Invention

The present invention relates generally to performing floating-point operations in a Central Processing Unit (CPU) of a computing device, and more particularly, to an improved floating point unit for more efficiently performing multiple multiply Add operations at the rate of one per cycle.

2. Description of the Prior Art

Many compute-intensive applications today use extended-precision fixed-point arithmetic. This includes applications such as conversion between binary and decimal and public-key algorithms such as Diffie Hellman, DSA, ElGamel, and (most importantly) RSA. Public-key-Algorithm (PKA) cryptography particularly, has become an essential part of the Internet. The most compute-intensive part of PKA is a modular exponentiation using very large integers; typically 1024 bits, 2048 bits, or even larger. This computation is executed in software using multiple-precision arithmetic. For example, a typical 1024-bit RSA exponentiation requires about 200,000 64-bit multiplies and twice that many 64-bit adds. The computing time for this on a work station or a personal computer is not normally significant, as this occurs only once per secure-socket-layer (SSL) transaction. However, at the server, where many sessions can be in progress at the same time, this computation tends to be the limiting factor for the number of SSL transactions that can be performed.

The software on the IBM eServer zSeries® (z/OS) available from assignee International Business Machines, Inc., implements 64-bit fixed-point instructions to perform this operation. Fixed-point multiply on the zSeries is relatively slow, a 64-bit multiply typically taking more than 20 cycles, and is not pipelined. Additionally, there are not enough fixed-point registers to keep intermediate results in the registers.

One solution is to implement special cryptographic accelerators. With current technology, it takes several accelerators (usually more than 10) to provide the performance required by one main-frame server. Current technology trends indicate that server performance is increasing faster than accelerator performance, so this imbalance will continue to worsen in the future. Additionally, these accelerators run asynchronously to the central processing unit (CPU), so there is also a significant performance overhead in the CPU to interface with the accelerator.

Moreover, most current floating-point improvements are primarily concerned with performance, (not function) and especially as this applies to denormalized operands. In the application for which MAA is intended, denormalized operands do not occur. (Denormalized operands are very tiny values, unnormalized operands can have values in the normal range, but with leftmost zeros in the fraction.) For example, U.S. Pat. Nos. 5,943,249 and 6,732,134 describe processors for performing floating point operations, however, are concerned with denormalized operands and not normal values. U.S. Pat. Nos. 6,256,655 and 6,904,446 describe floating point processing that meet criteria for preserving the integrity of the result (e.g., fractions is affected by the alignment of the input fractions.)

It would be highly desirable to provide an improved floating-point unit for providing efficient processing of multiple-precision fixed-point operands.

SUMMARY OF THE INVENTION

It is therefore one object of the present invention to provide an improved method of processing floating-point operations in a computer system.

It is another object of the present invention to provide such a method which more efficiently handles the processing of unnormalized floating-point numbers.

Particularly, the present invention is directed to an improved floating point unit for a computing device, e.g., a server, that provides efficient processing of multiple-precision fixed-point operands, and additionally provides a set of floating point instructions.

According to one aspect of the invention, the efficient processing of multiple-precision fixed-point operands is based on a basic building block called a multiply-add-add (MAA) function. The MAA building block has four input operands and two output operands, all with the same number of bits, and can be represented mathematically as: H, $L=A*B+C+D$. The result (H, L) is returned in two parts: (H) a high-order part and (L) a low-order part.

The MAA building block has the property that the result always fits with no loss of information (no carry out). The MAA building block also permits the software to use a carry-save technique and permits a parallel algorithm that can be pipelined.

According to this aspect of the invention, the input operands and result parts are all floating-point operands in the same format. Each result part is an entire floating-point number, complete with sign, exponent, and fraction, and thus each can be used directly with no conversion as the input to the next stage, which are other MAAs.

Thus a key aspect of the invention is the capability of generating a two-part result, both parts in a format compatible with the inputs. A further key aspect is the preservation of the integrity of the result. To preserve the integrity of the result:

The alignment of the resulting fractions must not be affected by the alignment of the input fractions. (The alignment is affected by the input exponents.); and The resulting exponents must be a function only of the input exponents and not affected by the alignment of the input fractions.

According to one aspect of the present invention, there is provided a computing system having an arithmetic logic unit adapted to produce both a high-order part (H) and a low-order part (L) of a fused multiply add operation result according to H, $L=A*B+C$, where A, B are input operands and C an addend, and where each part is formatted the same as the format of the input operands, wherein alignment of the result is not affected by alignment of the input operands.

According to a further aspect of the present invention, there is provided an arithmetic logic unit apparatus for processing an instruction for calculating A×B+C, the instruction indicating a plurality of operands (A, B) including an addend (C). The apparatus comprises:

a. a multiplier means for performing a multiplication of A and B operands to obtain an intermediate partial sum result and partial carry results;

b. a carry-save adder block for receiving the partial sum and carry expression and generating the explicit value of the result in a double wide format;

c. an aligner means for aligning in parallel operation, the C-operand to the product fraction, and generating the aligned addend which is in the range of the product; and, d. a carry-propagate adder means for generating an intermediate extended result in a double wide format; and, e. means for suppressing left-alignment of the intermediate extended result, whereby input operands for a subsequent A×B+C operation remain right-aligned.

According to a further aspect of the present invention, there is provided a method of processing an instruction in an arithmetic logic unit, the instruction indicating a plurality of operands (A, B) including an addend (C). The method comprises:

a. receiving, by an arithmetic logic unit, input operands A, B and C, said arithmetic logic unit including a hardware structure for executing an instruction for calculating A×B+C;

b. performing a multiplication of A and B operands in a Multiplier block to obtain an intermediate partial sum result and partial carry results;

c. inputting said partial sum and carry expression to a carry-save adder block that generates the explicit value of the result in a double wide format;

d. aligning in parallel operation, the C addend to the product and generating the aligned addend; and, e. generating an intermediate extended result in a carry-propagate adder that produces a result in a double wide format; and, f. suppressing left-alignment of said intermediate extended result, whereby input operands for a subsequent A×B+C operation remain right-aligned.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF PREFERRED EMBODIMENT

Figure 1:
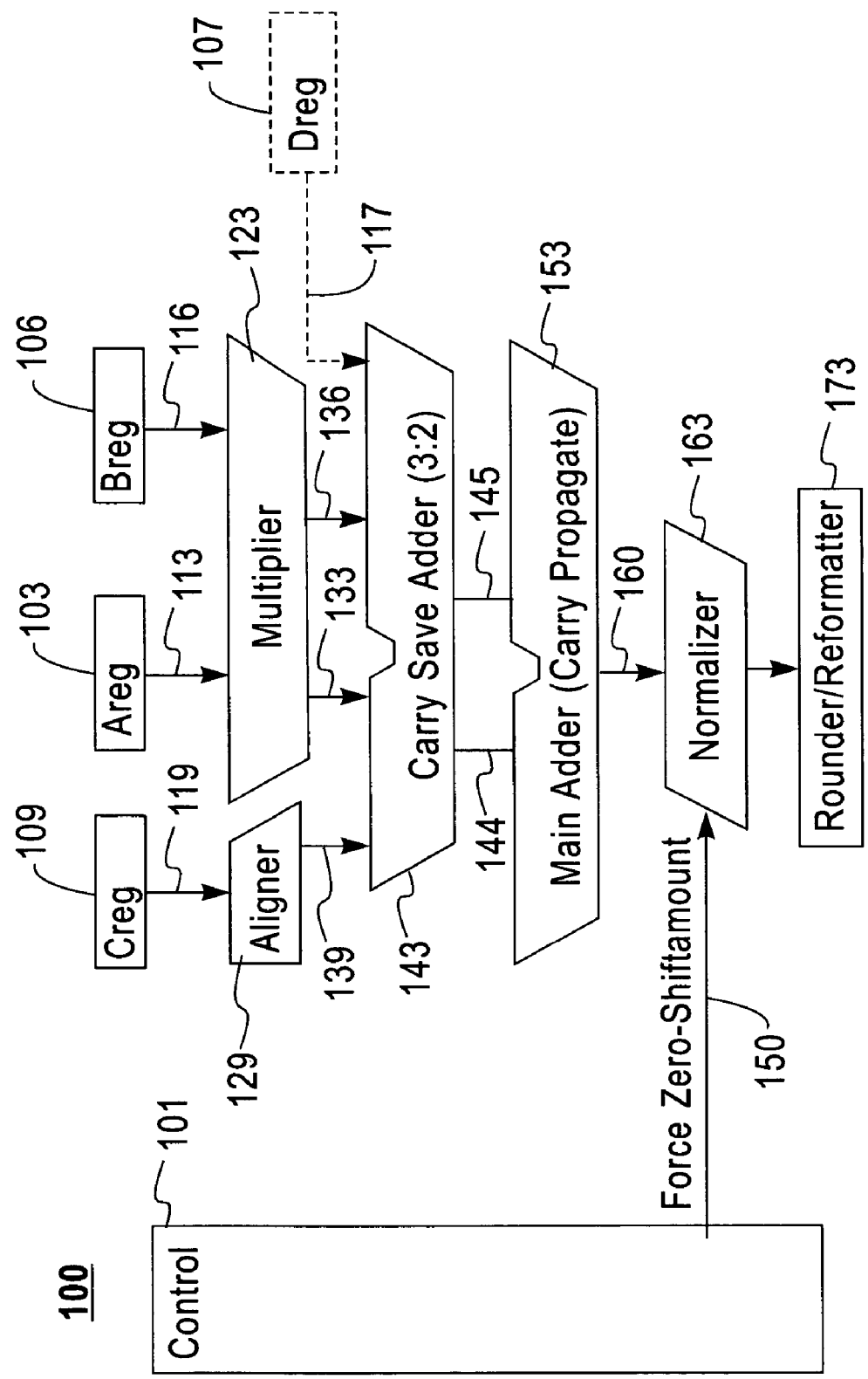
FIG. 1 is a block diagram of a floating-point execution unit constructed in accordance with a preferred embodiment of the present invention; and, FIG. 2 depicts an illustrative example of an Unnormalized MAA processing according to the invention.

The floating-point unit of a zSeries machine is capable of performing 64-bit hexadecimal floating-point (HFP) MULTIPLY ADDs at the rate of one per cycle. According to the invention, a new set of instructions are defined which can utilize this same data flow with very minor changes. One significant change is the elimination of the final normalization step, and the provision of new instructions named: MULTIPLY AND ADD UNNORMALIZED and MULTIPLY UNNORMALIZED.)

Basically, the mathematics of modular exponentiation is reformulated into a "carry-save" approach which permits the computations to be performed in parallel, thus utilizing the full pipelining of the hardware an inner loop, and the basic unit of the inner loop is one multiply and two adds (MAA). These new instructions can perform a 52-bit MAA in 5 cycles. (The fixed-point instructions can perform a 64-bit MAA in 28 cycles.)

FIG. 1 is a block diagram of a floating-point execution unit 100 constructed in accordance with the present invention. As shown in FIG. 1, this floating-point execution unit 100 includes three inputs for receiving input operands 113, 116, and 119 from respective registers A 103, B 106, and C 109, respectively. These source operands are expressed as floating-point numbers, and can be HFP long, i.e., 56-bit fractions. Floating-point execution unit 100 uses these operands to perform the MULTIPLY AND ADD UNNORMALIZED and MULTIPLY UNNORMALIZED according to the invention. Particularly, the floating-point execution unit 100 is a "fused Multiply and Add" hardware structure providing for a fraction dataflow. Particularly, this structure 100 calculates (A×B)+C. When there is a Multiply only, the C-operand 119 is forced to zero.

In operation, the three different operands are available in Areg, Breg and Creg. Mantissas of the A-operand 113 and B-operand 116 are multiplied in the Multiplier block 123 to obtain a partial "sum" result 133 and a partial "carry" expression 136 of the product. These product expressions are in carry-save form with a width of 112 bit each. The intermediate partial sum result and partial carry result 133,136 and the aligned addend fraction 139 are input to a carry-save adder block 143 that generates the result value in a double wide format, comprising 112 bits. This result is again in carry-save form consisting out of two partial results 144,145, which are both in that double wide format (i.e., HFP extended). That is, the carry-save adder condenses the three 112 bit wide operands into two. Here a fourth operand could be added, when the Carry-save adder is expanded from 3:2 to 4:2. That is, as shown in FIG. 1, a D-Operand 117 from a register 107 could be added at the Carry Save Adder which would render it a Carry-Save-Adder (4:2) block. It should be understood that the Carry-Save-Adder (3:2) block 143 may be part of the subsequent main adder/incrementer stage or part of the prior multiplier stage 123.

In parallel operation, the C-operand (addend) 119 is aligned to the product fraction, by comparing the product exponent and the addend exponent. The difference delivers the align-shift-amount (positive or negative) by which the added fraction has to be shifted. The result of this is a 112 bit wide aligned addend fraction 139. It is the 112 bit wide window of the extended C-Fraction, which is in the range of the product.

The Main-Adder block 153 generates the intermediate extended result 160. It is a carry-propagate adder, which delivers the explicit value of the fraction result in a double wide format (e.g., 112 bits in an example implementation). The 112 bit intermediate result 160 may thus be split as two 56-bit fractions referred to as a high-order part (H) and a low-order part (L) that may be placed in a floating-point register pair (not shown).

For normal floating-point operation, the Normalizer block 153 would perform a left shift, to remove leading zero bits of the result. However, according to the invention, this normalization is suppressed. The basic operation performed by the Normalizer 153 is a shift left operation. The Normalizer obtains the Norm-Shift-Amount, as indicated by receipt of a signal 150 from the control block 101, which indicates how many leading zero's are in the adder output. The suppressing of normalization is performed by forcing that Norm-Shift-Amount to zero, independent of the actual adder result.

The Rounder/Reformatter block generates again the 64 bit HFP Format with exponent and 56 bit fraction. Rounding is done by truncation, if needed. At this point, the high-order part (H) or low-order part (L) results are selected. When both results are required, an additional cycle is needed.

As further shown in FIG. 1, the control block 101 generates the signal(s) that controls the Fraction Dataflow according to the invention. While functioning similarly as floating-point multiply and add operations, the control flow executed under control of control block 101 and performed after the operands are available in A-Reg, B-Reg and C-Reg include: 1) suppressing pre-normalization of the input operands (contrary to prior art implementation where a floating-point MAA would first normalize the input operands when unnormalized). According to the invention, the input operands are always taken as is; 2) calculating result exponent, which is directly the product exponent Exp(Prod), according to:

a. Exp(Prod):=Exp(A)+Exp(B)−x'40'
    b. where x'40' is a bias, in an example embodiment, and perform an Align-Shift-Amount according to:
    c.    SA(Align):=Exp(Prod)−Exp(C)=Exp(A)+Exp(B)−x'40'−Exp(C);

3) perform the Multiplication, Alignment, perform the carry save addition for Multiplier and Aligner outputs and, perform the main addition and retrieve get extended result; 4) suppressing normalization by forcing Norm-Shift-Amount=0; and, 5) depending on the instruction, the High, Low or both result parts are taken and written back as Result in HFP form. The exponent is added to the fraction.

a. MAYH: High Result
    b. MAYL: Low Result (Exponent:=HighExponent−14 or x'E')
    c. MAY: High Result and Low Result−one extra cycle necessary Thus, according to the invention, the control block implements logic for forcing a shift-amount of zero, or in other words, suppressing the normalization. Advantageously, the control logic, implemented by control block 101, is less expensive to design, as it can be synthesized and does not need costly manual custom design as the fraction dataflow. It is less timing critical than the dataflow, which limits the cycle time and performance.

Moreover, implementation of the Fraction Dataflow is designed and implemented to allow a fast execution of a floating-point MULTIPLY AND ADD instruction. It can be taken unchanged for the UNNORM MULTIPLY AND ADD. With that, a pipelined performance of one instruction per cycle is possible. For instructions which need to write the extended result, two cycles per instruction are necessary.

FIG. 2 depicts an illustrative example of the invention. It is noted that the numbers for exponent and fraction represent hexadecimal digits in the range 0 to F. Thus, as shown in FIG. 2, the unnormalized operand values according to HFP definitions are: A-Operand (Multiplier) having the value 16**(42−40)*0.000101 01000000; B-Operand (Multiplicand) having the value 16**(43−40)*0.020000 00000003; C-Operand (Addend) having the value 16**(41−40)*0.111111 11111111; C-Operand (Addend aligned) having a value 16**(45−40)*0.000011 11111111 111100 00000000; and, Product having a value 16**(45−40)*0.000002 02020000 000303 03000000. The Product Exponent is calculated by 42+43−40=45, whereby 40 is the bias for HFP format in hexadecimal digits. There is an Exponent difference of 4 (45−41) between product and addend exponent—therefore the controller block initiates a shift right of 4 to align the C-fraction. Implementing this operation, pre-existing floating-point fraction dataflow may be used without modification. The Unnormalized MAA specific implementation according to the invention is enabled by the control block unit that performs the operation to suppress the prenormaliztion of A, B, and C operand, force the result exponent as fixed Product exponent: Exp(Result):=Exp(A)+Exp(B)−Bias (Bias:=x'40'); and, suppress normalization, by forcing Norm_Shift_Amount:=0.

It should be understood that handling of Negative Signs in the context of the invention is implemented in a manner similar as in current floating-point MAA units. It is noted that as each of the Operands can have a negative Sign, there is differentiation between "Effective Addition" and 'Effective Subtraction'. For 'Effective Subtraction" the C-Operant is inverted and after the Main Adder the two's complement is used, which has the effect of an subtraction.

According to the invention, the new HFP instructions MULTIPLY UNNORMALIZED and MULTIPLY AND ADD UNNORMALIZED are extensions to the hardware required to implement the HFP instructions MULTIPLY AND ADD AND MULTIPLY AND SUBTRACT. Further details of the HFP instructions may be found in a reference the z/Architecture "Principles of Operation", SA22-7838-02, Chapter 18, dated June, 2003, the whole contents and disclosure of which are incorporated by reference as if fully set forth herein. According to the invention, twelve operation codes are defined, all of which are simple variations (or subsets) of the following function:

$$t1 \leftarrow op3*op2+op1$$

where the source operands are HFP long (56-bit fractions); the multiply and add operations are performed without normalization; the intermediate result is HFP extended (112-bit fraction split as two 56-bit fractions called the high-order part and low-order part); and the value returned is placed into a target location designated by a field.

The instructions are now described in greater detail as follows:

HFP Multiply Unnormalized

The instruction HFP Multiply Unnormalized instruction in a first variation has a structure as follows:

Mnemoni c1   $R_1, R_3, R_2$   [RRF]

| Op Code | $R_1$ | //// | $R_3$ | $R_2$ |
|---|---|---|---|---|
| 0 | 16 | 20 | 24 | 28  31 | with a first variation MYR utilizing Long HFP multiplier multiplicand (operands) producing an extended HFPproduct; a second variation MYHR utilizing Long HFP multiplier multiplicand (operands) producing a high-order part of extended HFPproduct; and, a third variation MYLR utilizing Long HFP multiplier multiplicand operands producing a low-order part of the extended HFPproduct.

In a second variation, the Multiply Unnormalized instruction has a structure as follows:

Mnemoni c2   $R_1, R_3, D_2(X_2, B_2)$   [RXF]

| Op Code | $R_a$ | $X_2$ | $B_2$ | $D_2$ | $R_1$ | //// | Op Code |
|---|---|---|---|---|---|---|---|
| 0 | 8 | 12 | 16 | 20 | 32 | 36  40 | 47 | with a first variation MY utilizing Long HFP multiplier and multiplicand (operands) producing an extended HFPproduct; a second variation MYH utilizing Long HFP multiplier and multiplicand producing a high-order part of extended HFPproduct; and, a third variation MYL utilizing Long HFP multiplier and multiplicands producing the low-order part of extended HFPproduct.

In both instructions, the second and third HFP operands are multiplied, forming an intermediate product, which, in turn, is used to form an intermediate extended result. All (or a part) of the intermediate extended result is placed in the floating-point-register pair (or floating-point register) designated by the R1 field. The operands, intermediate values, and results are not normalized to eliminate leading hexadecimal zeros. Multiplication of two HFP numbers consists in exponent addition and fraction multiplication. The sum of the characteristics of the second and third operands, less 64, is used as the characteristic of the high-order part of the intermediate product; this value is independent of whether the result fraction is zero. The characteristic of the intermediate product is maintained correctly and does not wrap.

The high-order characteristic of the intermediate extended result is set to the characteristic of the intermediate product, modulo 128. The low-order characteristic of the intermediate extended result is set to 14 less than the high-order characteristic, modulo 128. Wrap-around of the characteristic is independent of whether the result fraction is zero. In all cases, the second- and third-operand fractions have 14 digits; the intermediate-product fraction contains 28 digits and is an exact product of the operand fractions. The intermediate-product fraction is not inspected for leading hexadecimal zero digits and is used without shifting as the fraction of the intermediate extended result. The sign of the result is the exclusive or of the operand signs, including the case when the result fraction is zero.

For MY and MYR, the entire intermediate extended result is placed in the floating-point register pair designated by the R1 field. For MYH and MYHR, the high-order part of the intermediate extended result is placed in the floating-point register designated by the R1 field and the low-order part is discarded. For MYL and MYLR, the low order part of the intermediate extended result is placed in the floating-point register designated by the R1 field and the high-order part is discarded. HFP-exponent-overflow and HFP-exponent underflow exceptions are not recognized. Characteristics of the intermediate extended result wrap-around modulo 128 and no exception is reported.

The R1 field for MY and MYR must designate a valid floating-point-register pair. Otherwise, a specification exception is recognized.

It is understood that the HFP MULTIPLY UNNORMALIZED differs from HFP MULTIPLY in the following ways: 1) Source operands are not normalized to eliminate leading hexadecimal zeros; 2) The intermediate-product fraction is not inspected for leading hexadecimal zeros and no normalization occurs; 3) HFP exponent overflow and HFP exponent underflow are not recognized; 4) Zero fractions are not forced to true zero.

HFP Multiply and Add Unnormalized

The instruction HFP Multiply And Add Unnormalized instruction according to a first variation has a structure as follows:

Mnemoni c1    $R_1, R_3, R_2$    [RRF]

| Op Code | $R_1$ | //// | $R_3$ | $R_2$ |
|---|---|---|---|---|
| 0 | 16 | 20 | 24 | 28  31 | with a first variation MAYR utilizing Long HFP sources producing an extended HFP result; a second variation MAYHR utilizing Long HFP sources to produce a high-order part of an extended HFP result; and, a third variation MAYLR utilizing Long HFP sources to produce the low-order part of an extended HFP result.

In a second variation, the Multiply And Add Unnormalized instruction has a structure as follows:

Mnemoni c2    $R_1, R_3, D_2(X_2, B_2)$    [RXF]

| Op Code | $R_a$ | $X_2$ | $B_2$ | $D_2$ | $R_1$ | //// | Op Code |
|---|---|---|---|---|---|---|---|
| 0 | 8 | 12 | 16 | 20 | 32 | 36  40 | 47 | with a first variation MAY utilizing Long HFP sources producing extended HFP result; a second variation MAYH utilizing Long HFP sources to produce the high-order part of the extended HFP result; and, a third variation MAYL utilizing Long HFP sources to produce the low-order part of the extended HFP result.

The second and third HFP operands are multiplied, forming an intermediate product; the first operand (addend) is then added algebraically to the intermediate product to form an intermediate sum; the intermediate-sum fraction is truncated on the left or on the right, if need be, to form an intermediate extended result. All (or a part) of the intermediate extended result is placed in the floating-point-register pair (or floating-point register) designated by the R1 field. The operands, intermediate values, and results are not normalized to eliminate leading hexadecimal zeros.

Contrary to the register-to-register variation, whereby the second operand is in a floating-point register and is designated by the R1 field (in the RRF-format instruction); this instruction includes a storage-to-register variation, whereby the second operand is in storage and is designated by the X2, B2, and D2 fields (in an RXF-format instruction). In all variations, the third operand, the multiplicand, is in a floating-point register and is designated by the R3 field in the instruction. Moreover, in all variations, the target location is designated by the R1 field in the instruction. For MULTIPLY AND ADD UNNORMALIZED, the R1 field also designates the addend. When, for MULTIPLY AND ADD UNNORMALIZED, the target location is one floating-point register, the same floating-point register is used as both the addend and the target. When the target location is a floating-point register-pair, the R1 field may designate either the lower-numbered or higher-numbered register of a floating-point-register pair; thus, the first operand may be located in either of the two registers of the floating-point-register pair into which the extended result is placed.

The MULTIPLY AND ADD UNNORMALIZED operations may be summarized as:

t1 ← op3*op2+op1

Multiplication of two HFP numbers consists in exponent addition and fraction multiplication. The sum of the characteristics of the second and third operands, less 64, is used as the characteristic of the high-order part of the intermediate product; this value is independent of whether the result fraction is zero. The characteristic of the intermediate product is maintained correctly and does not wrap.

In all cases, the second- and third-operand fractions have 14 digits; the intermediate-product fraction contains 28 digits and is an exact product of the operand fractions. The intermediate-product fraction is not inspected for leading hexadecimal zero digits and is used without shifting in the subsequent addition.

In all cases, the first operand is located in the floating-point register designated by the R1 field and the first-operand fraction has 14 digits. Addition of two HFP numbers consists in characteristic comparison, fraction alignment, and signed fraction addition. The characteristics of the intermediate product and the addend are compared. If the characteristics are equal, no alignment is required. If the characteristic of the addend is smaller than the characteristic of the product, the fraction of the addend is aligned with the product fraction by a right shift, with its characteristic increased by one for each hexadecimal digit of shift. If the characteristic of the addend is larger than the characteristic of the product, the fraction of the addend is aligned with the product fraction by a left shift, with its characteristic decreased by one for each hexadecimal digit of shift. Shifting continues until the two characteristics agree. All hexadecimal digits shifted out are preserved and participate in the subsequent addition.

After alignment, the fractions with signs are then added algebraically to form a signed intermediate sum. The fraction of the intermediate sum is maintained exactly. The intermediate-sum fraction is not inspected for leading hexadecimal zero digits and is not shifted. Only those 28 hexadecimal digits of the intermediate-sum fraction which are aligned with the 28 hexadecimal digits of the intermediate-product fraction are used as the fraction of the intermediate extended-result.

The high-order characteristic of the intermediate extended result is set to the characteristic of the intermediate product, modulo 128. The low-order characteristic of the intermediate extended result is set to 14 less than the high-order characteristic, modulo 128. Wrap-around of the characteristic is independent of whether the result fraction is zero.

The sign of the result is determined by the rules of algebra, unless the entire intermediate-sum fraction is zero, in which case the sign of the result is made positive. For MAY and MAYR, the entire intermediate extended result is placed in the floating-point register-pair designated by the R1 field; the R1 field may designate either the lower-numbered or higher-numbered register of a floating-point register pair. For MAYH and MAYHR, the high-order part of the intermediate extended result is placed in the floating-point register designated by the R1 field and the low-order part is discarded.

For the MAYL and MAYLR, the low-order part of the intermediate extended result is placed in the floating-point register designated by the R1 field and the high-order part is discarded. HFP-exponent-overflow and HFP-exponent-underflow exceptions are not recognized. Characteristics of the intermediate extended result wrap-around modulo 128 and no exception is reported.

It should be understood that the MULTIPLY AND ADD UNNORMALIZED can be used to efficiently perform multiple precision arithmetic on numbers of any arbitrary size. This is accomplished by organizing the numbers into big digits of 52 bits each, with each big digit maintained as an integer in the HFP long format. Using a radix of 252 and big digits which can hold up to 56 bits provides a redundant representation. This redundant representation permits multiplication and addition using a "carry save" technique and permits maximum utilization of the floating point pipeline.

Further, by setting the multiplier to an integer value of 1 with the proper characteristic, the multiplicand can be scaled by any power of 16 and then added to the addend. This permits, for example, adding the "carry" from one stage of a multiplication to the "sum" of the next stage to the left. In the same manner, the "sum" of one stage can be scaled to be added to the "carry" of the stage to the right.

Moreover, it should be understood that in a first round of a multiply and accumulate, the step of clearing the accumulated value to zero, may be avoided by using the MULTIPLY UNNORMALIZED instead of MULTIPLY AND ADD UNNORMALIZED.

The HFP MULTIPLY AND ADD UNNORMALIZED differs from HFP MULTIPLY AND ADD in the following ways: 1) Source operands are not normalized to eliminate leading hexadecimal zeros; 2) When the characteristic of the intermediate product and the characteristic of the addend differ, the addend is always shifted; 3) There is no shifting after the addition, only the rightmost 28 digits of the intermediate sum are preserved in the intermediate extended result; 4) The low-order part of the intermediate extended result can be returned; 5) HFP exponent overflow and HFP exponent underflow are not recognized; 6) Zero fractions are not forced to true zero.

Advantageously, the HFP MULTIPLY UNNORMALIZED and HFP MULTIPLY AND ADD UNNORMALIZED instructions can be run on any CPU in the IBM System z9 or, an IBM eServer® zSeries® (e.g., a zSeries 990 (z990, z900) or zSeries 890 (z890)) systems, etc.). Thus, the solution scales with number of CPUs and CPU performance. The use and advantages of the proposed facility include:

Utilizes the floating-point hardware pipeline to multiply two 56-bit fractions to produce a 112-bit intermediate-product fraction, then add a 56-bit addend fraction to produce a 112-bit result fraction. The expected latency is seven cycles, but throughput is expected to be one HFP long result every cycle. Either the low order part or the high-order part can be returned at the rate of one per cycle, or the entire 112-bit fraction can be returned in two cycles. This is contrasted to the instructions MULTIPLY LOGICAL (MLG) which multiplies two 64-bit unsigned integers to form a 128-bit unsigned product and ADD LOGICAL WITH CARRY (ALCG) which adds two 64-bit unsigned integers. MLG and ALCG take 20 cycles and 2 cycles, respectively, and are not pipelined.

Use of the 16 floating-point registers (FPRs) for intermediate results greatly reduces the number of load and store operations. As an example, the basic multiply-accumulate step is reduced from 5 cycles per big digit if load and store are necessary, to 3 cycles per big digit, if the results can be maintained in the FPRs. This is contrasted with MLG and ALCG, which use general registers as accumulators with much less opportunity to keep intermediate results in registers.

Computations are performed on big digits in the HFP long format. The HFP long format has a 56-bit fraction, but a radix of $2^{52}$ is used. This redundant representation permits multiplication and addition of larger numbers without intermediate overflow. For example, the product of two 53-bit values can be added to a 56-bit intermediate sum to produce a 52-bit "sum" and a 55-bit "carry" without overflow. The 55-bit "carry" can be added to the 52-bit "sum" of the next digit to form the next 56-bit intermediate sum. This technique is called "carry save" as carries do not need to ripple all the way from right to left during an addition. Use of the "carry save" technique maximizes utilization of the floating-point pipeline. Thus, the basic multiply-accumulate step is 3 cycles per big digit, compared to a ripple carry, which would require 7 cycles per big digit.

Use of the HFP format, including the exponent, permits automatic scaling of numbers in the redundant format. The basic multiply accumulate step involves one multiply and two adds. The first add is included with the multiply. The second add, which combines the "carry" from one stage into the next stage, is performed using MULTIPLY ADD UNNORMAL- IZED (MAYLR) rather than ADD UNNORMALIZED (AWR). This permits scaling of the exponent to properly align the value for addition. As it is expected that the multiply add instructions can be pipelined at the rate of one instruction per cycle, there is very little additional overhead involved in using MAYLR rather than AWR.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

Having thus described our invention, what we claim as new, and desire to secure by Letters Patent is:

1. A method of processing an instruction in an arithmetic logic unit, the instruction indicating a plurality of operands (A, B) including an addend (C), said method comprising:
   receiving, by an arithmetic logic unit, input operands A, B and C, said arithmetic logic unit including a hardware structure for executing an instruction for calculating A×B+C;
   performing a multiplication of A and B operands in a Multiplier block to obtain an intermediate product including partial sum results and partial carry results;
   aligning in parallel operation, the C addend to the intermediate product and generating the aligned addend;
   inputting said partial sum and carry expression results and the aligned addend to a carry-save adder block that generates an explicit value of the result in carry-save form in a double wide format; and,
   generating, from said carry-save form result, an extended result in a carry-propagate adder that produces an explicit extended result in a double wide format; and,
   preventing normalization of said explicit extended result by suppressing left-alignment of said explicit extended result, whereby input operands for a subsequent A×B+C operation remain right-aligned.

2. The method of processing an instruction as claimed in claim 1, wherein said instruction is an HFP MULTIPLY AND ADD instruction whereby said input A, B, C operands have fractions of 56 bits each and said product is a double wide format having a fraction of 112 bits.

3. The method of processing an instruction as claimed in claim 1, wherein said instruction is an HFP MULTIPLY instruction whereby said input A and B operands have fractions of 56 bits each and said C operand is zero.

4. The method of processing an instruction as claimed in claim 1, further comprising: splitting said explicit extended result of double wide format into a high-order (H) part and a low-order (L) part for further propagation.

5. The method of processing an instruction as claimed in claim 1, wherein said aligning of the C addend in parallel operation includes: comparing the product exponent and the addend exponent and delivering an the align-shift-amount by which the added fraction has to be shifted according to the compared exponents.

6. The method of processing an instruction as claimed in claim 1, wherein said step of suppressing left-alignment of said intermediate extended result includes generating a signal for receipt by a normalization unit that shift a normalization amount to zero, independent of the actual intermediate extended result.

7. The method of processing an instruction as claimed in claim 1, wherein said C addend is a first addend and said carry-save adder block is a 3:2 carry-save adder block, said method further comprising: calculating A×B+C+D wherein D is a second addend and said carry-save adder block is a 4:2 carry-save adder block.

8. An arithmetic logic unit apparatus for processing an instruction for calculating A×B+C, the instruction indicating a plurality of operands (A, B) including an addend (C), said apparatus comprising:
   a multiplier means for performing a multiplication of A and B operands to obtain an intermediate product including partial sum results and partial carry results;
   an aligner means for aligning in parallel operation, the C-operand to the intermediate product, and generating the aligned addend; and,
   a carry-save adder block for receiving said partial sum and carry expression results and the aligned addend and generating an explicit value of the result in carry-save form in a double wide format;
   a carry-propagate adder means for generating, from said carry-save form result, explicit extended result in a double wide format; and,
   means for preventing normalization of said explicit extended result by suppressing left-alignment of said extended result, whereby input operands for a subsequent A×B+C operation remain right-aligned.

9. The apparatus as claimed in claim 8, wherein said instruction is an HFP MULTIPLY AND ADD instruction whereby said input A, B, C operands have fractions of 56 bits each and said product is a double wide format with a fraction of 112 bits.

10. The apparatus as claimed in claim 8, wherein said instruction is an REP MULTIPLY instruction whereby said input A and B operands have fractions of 56 bits each and said C operand is zero.

11. The apparatus as claimed in claim 8, further comprising: a reformatter block for receiving said explicit extended result of double wide format and splitting said explicit extended result into a high-order (H) part and a low-order (L) part for further propagation.

12. The apparatus as claimed in claim 8, wherein said aligner means comprises means for comparing the product exponent and the addend exponent and delivering an the align-shift-amount by which the added fraction has to be shifted according to the compared exponents.

13. The apparatus as claimed in claim 8, wherein said means for suppressing left-alignment of said intermediate extended result includes control means for generating a signal for receipt by a normalization unit that shifts a left-alignment amount to zero, independent of the actual intermediate extended result.

14. The apparatus as claimed in claim 8, wherein said C addend is a first addend and said carry-save adder block is a 3:2 carry-save adder block, said arithmetic logic unit apparatus for processing an instruction for calculating A×B+C+D wherein D is a second addend and said carry-save adder block is a 4:2 carry-save adder block.

* * * * *